Feb. 12, 1952 H. J. RIBLET 2,585,173

RADIO-FREQUENCY TRANSMISSION LINE CIRCUIT

Filed July 1, 1948 7 Sheets-Sheet 1

INVENTOR
HENRY J. RIBLET
BY Elmer J. Gorn
ATTORNEY

INVENTOR
HENRY J. RIBLET
BY Elmer J. Gorn
ATTORNEY

INVENTOR
HENRY J. RIBLET
BY Elmer J. Gorn
ATTORNEY

RADIO-FREQUENCY TRANSMISSION LINE CIRCUIT

Filed July 1, 1948 7 Sheets-Sheet 4

INVENTOR
HENRY J. RIBLET
BY Elmer J. Gorn
ATTORNEY

INVENTOR
HENRY J. RIBLET
BY [signature]
ATTORNEY

RADIO-FREQUENCY TRANSMISSION LINE CIRCUIT

Filed July 1, 1948 7 Sheets-Sheet 6

INVENTOR
HENRY J. RIBLET
BY Elmer J. Gorn
ATTORNEY

INVENTOR
HENRY J. RIBLET
BY Elmer J. Gorn
ATTORNEY

Patented Feb. 12, 1952 2,585,173

UNITED STATES PATENT OFFICE 2,585,173

RADIO-FREQUENCY TRANSMISSION LINE CIRCUIT

Henry J. Riblet, Belmont, Mass., assignor to Raytheon Manufacturing Company, a corporation of Delaware Application July 1, 1948, Serial No. 36,303

27 Claims. (Cl. 178—44)

This invention relates to high frequency electrical circuits for radar systems, and in particular to a novel antenna coupling circuit for simultaneous lobe comparison systems.

Radar systems are known wherein the energy applied to or derived from an antenna array is so governed that information relating to the distance, elevation, and azimuth of an observed object or target is all provided simultaneously to an observer, and without moving parts in the array. Generally, a suitable antenna array comprises four antenna elements which may be directive in themselves or may cooperate with a focussing reflector or lens to produce directivity. The elements are arranged about an axis of directivity in two sets of conjugate pairs, so that there are two above and two below, as well as two on each side of the axis. When energy is furnished to all the elements at equal power levels with voltages all in the same phase, a single beam of wave energy is produced, directed along the axis. If one pair of elements, for example, the pair on one side of the axis, is fed 180 degrees out of phase with its conjugate pair, the beam splits along the axis, here from side to side, and there is a sharp null on the axis with two sharply rising lobes, one on each side thereof. The beam can be thus split in the vertical or the horizontal plane, depending on the manner in which the antenna elements are fed, or connected to the system, and information about elevation or azimuth becomes available by the known process of simultaneous lobe comparison. The present circuit improves on known simultaneous lobe comparison circuits by providing a physically smaller and more compact arrangement than has heretofore been known, which is readily installed in known radar systems.

It is the main object of the invention to provide an improved, mechanically compact and sturdy, and electrically efficient radio frequency circuit for simultaneous lobe comparison.

It is another object to provide such an improved circuit which is in itself not frequency critical, or difficult to construct and employ.

It is another object of the invention to provide such a circuit which makes the maximum use of the minimum number of component parts and space that can be employed. To this end the four transmission line sections that are connected to the four antenna elements of the array are directly coupled to each other by directional couplers without any increase in the space that would normally be occupied by the transmission lines themselves.

Other and further objects and features of the invention will become apparent from the description thereof that follows. The description refers to the accompanying drawing, wherein Fig. 1 is an isometric view of an embodiment of the invention as practiced with waveguides;

Fig. 2 is a cross-section on line 2—2 of Fig. 1;

Figs. 3A and 3B to 7A and 7B, inclusive, are vector diagrams illustrating the operation of certain components of the invention;

Figures 1, 2:
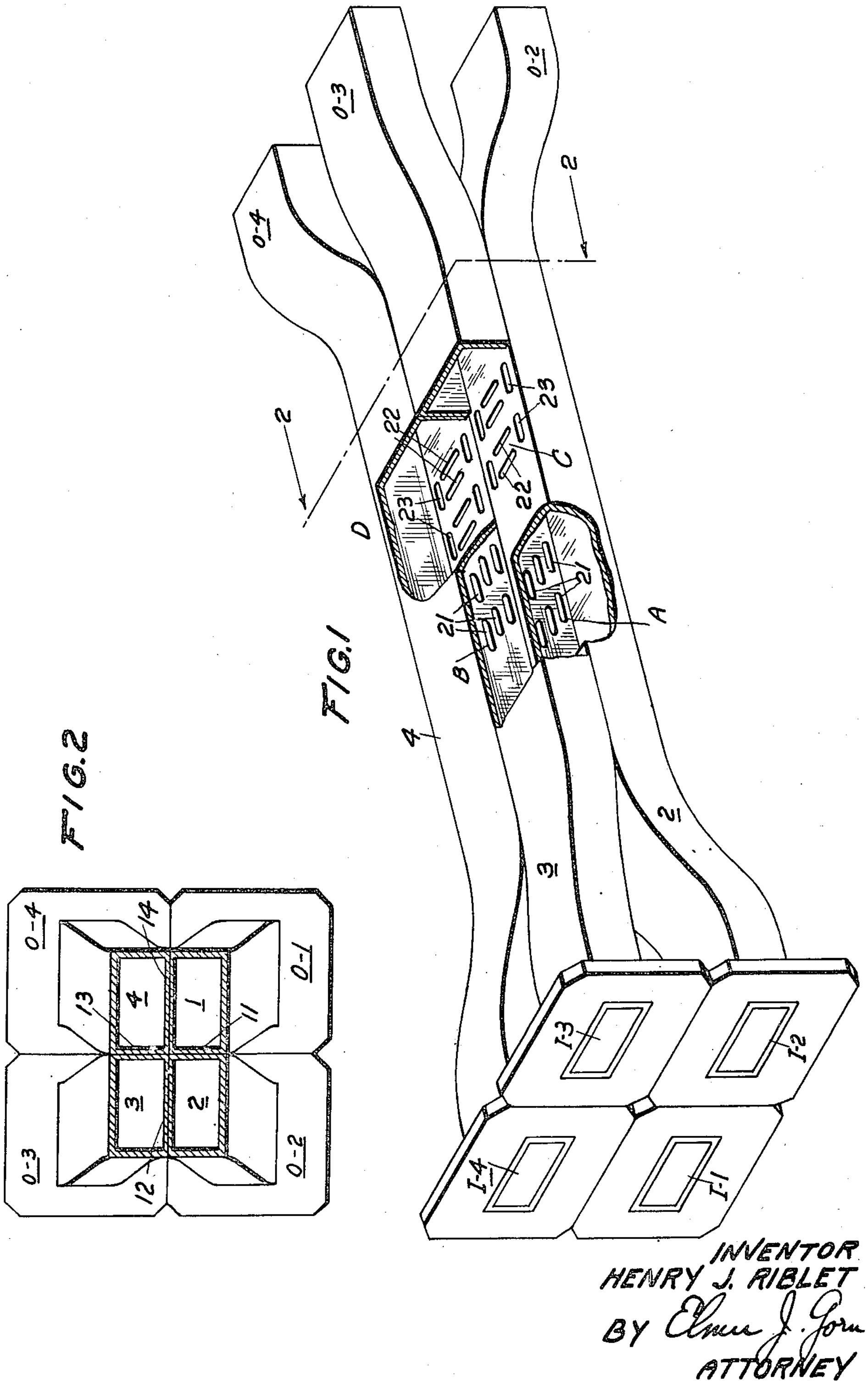
Figures 8, 8A:
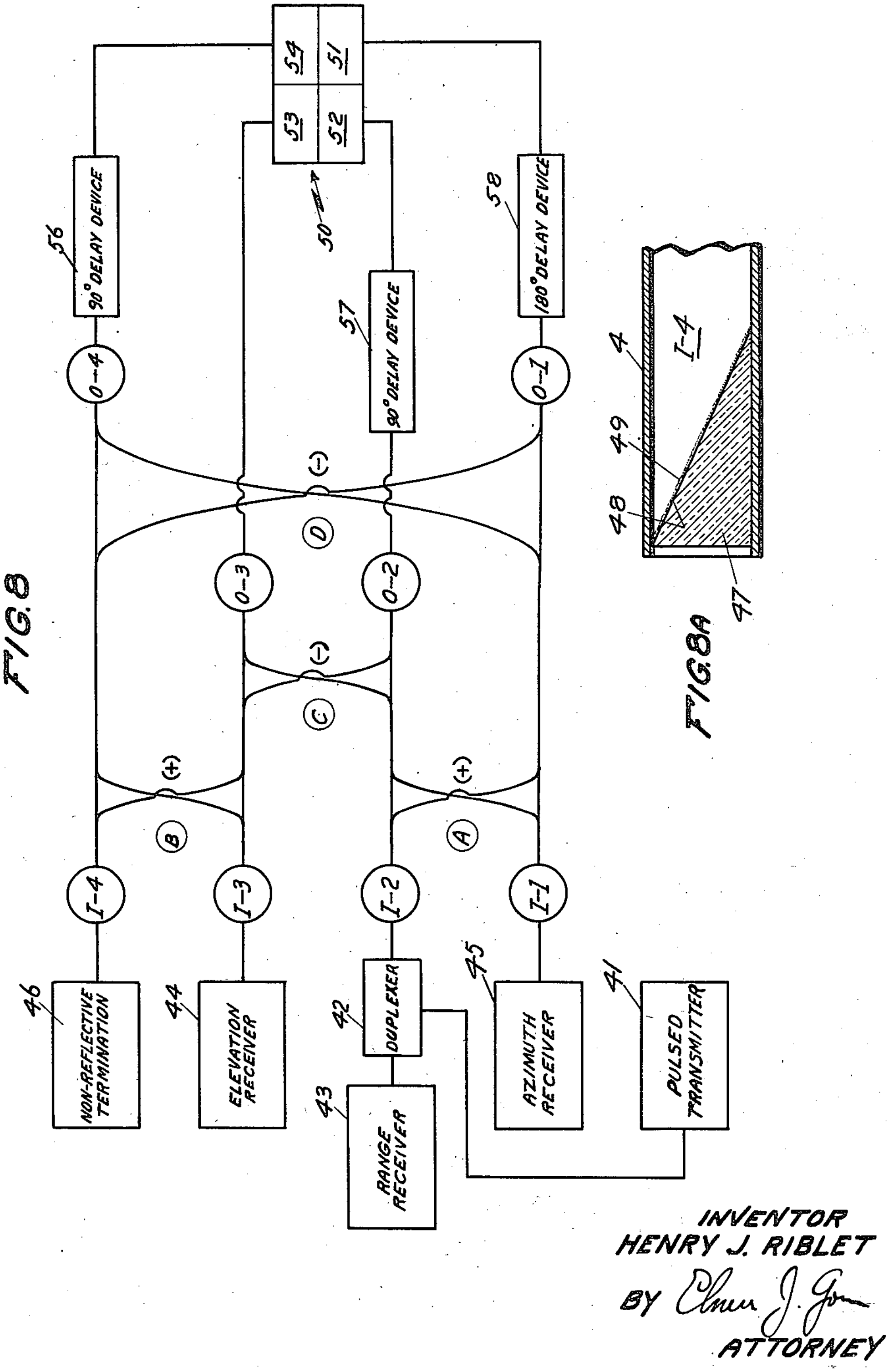
Fig. 8 is a diagram, partly in block form, showing the embodiment of Fig. 1 as employed in a complete radar system, and illustrating the power-flow paths in the circuit of the invention.
Fig. 8A illustrates a non-reflective line termination.
Figures 16, 17:
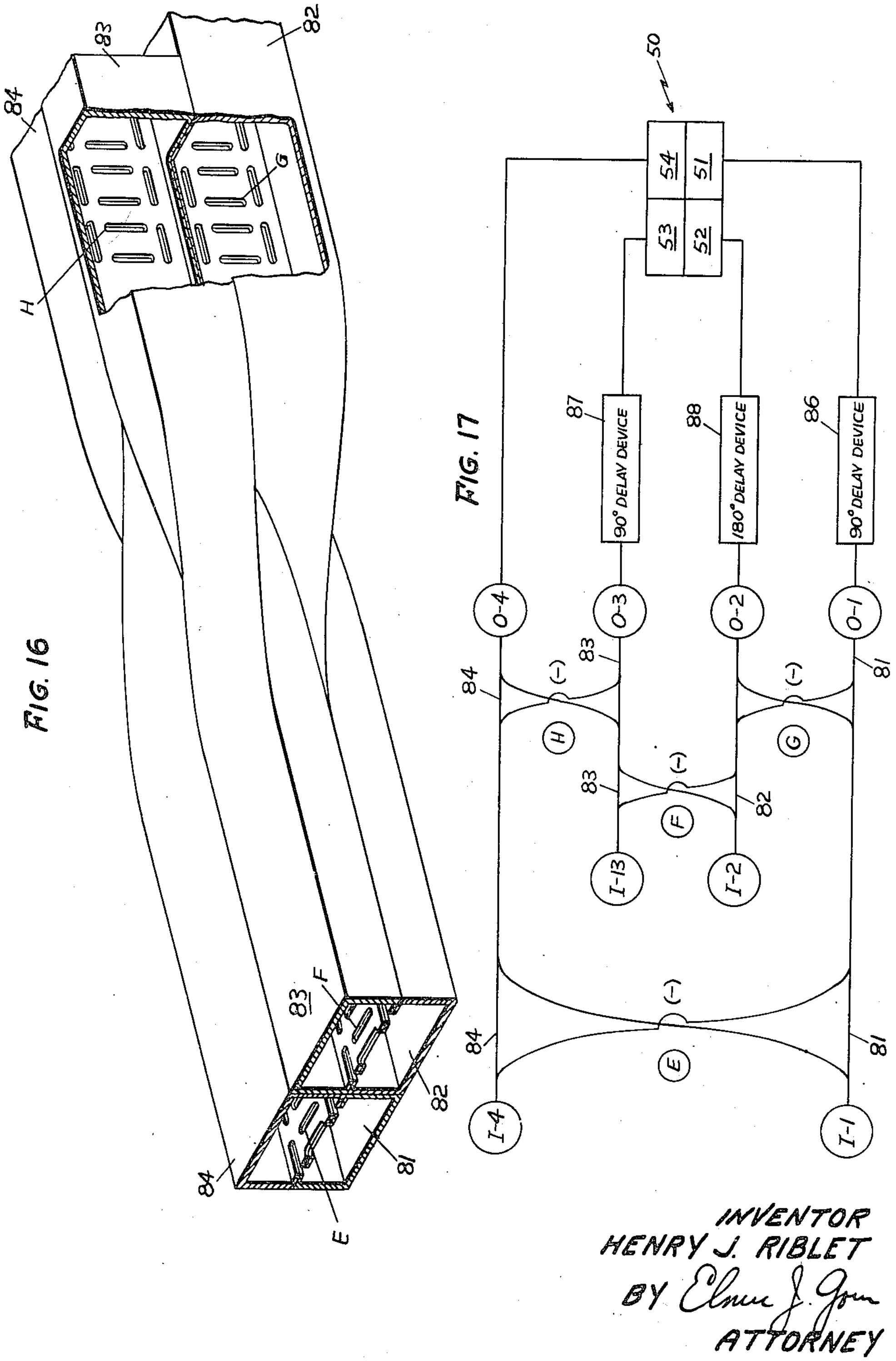
Figure 18:
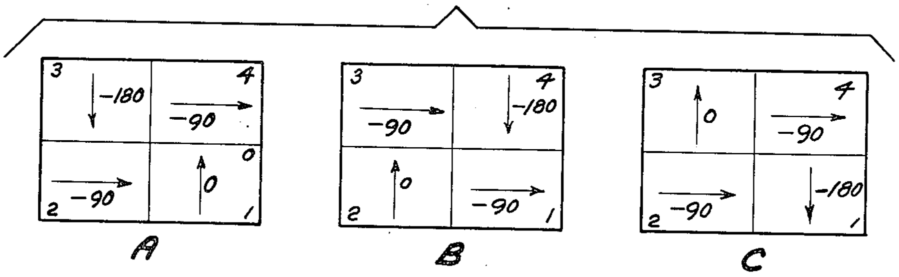
Figure 19:
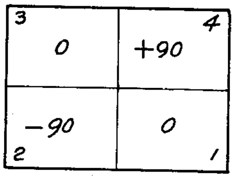
Figure 20:
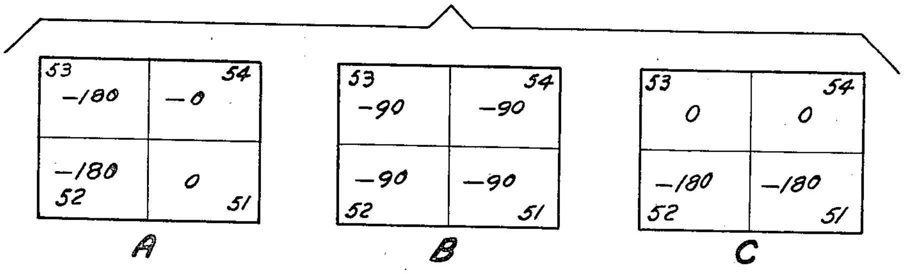

Figs. 12 to 15, inclusive, are diagrams illustrating the operation of the embodiment of the invention illustrated in Fig. 1;

Fig. 16 is an isometric view of another embodiment of the invention;

Fig. 17 is a diagram, like Fig. 8, showing the embodiment of Fig. 2 as employed in the complete radar system; and Figs. 18 to 20, inclusive, are diagrams illustrating the operation of the embodiment of the invention shown in Fig. 16.

Copending application Serial Number 34,536, filed June 22, 1948, now Patent 2,568,090, discloses a transmission system using a generally similar directional coupler.

Referring now to Figs. 1 and 2, four identical rectangular waveguides 1, 2, 3 and 4, respectively, are arranged parallel to each other contiguously in two sets of conjugate pairs, each sharing one wide wall and one narrow wall with its neighbors. Thus, as shown more clearly in Fig. 2, the first waveguide 1 shares a narrow wall 11 in common with the second waveguide 2, and a first wide wall 14 in common with the fourth waveguide 4; the second waveguide 2 shares a wide wall 12 in common with the third waveguide 3; and the third waveguide 3 shares a narrow wall 13 with the fourth waveguide 4. Each common wall is made up of two confronting wall portions of the two waveguides that share the common wall, which portions are preferably reduced in thickness, as by milling, before being brought together, so that the resultant common wall will not be unnecessarily thick and heavy. The two common wide walls 12 and 14 lie contiguously side by side in the same plane and the two narrow walls 11 and 13 likewise lie contiguously side by side in a common plane perpendicular to the first-mentioned plane. This arrangement is economical in space, material, and weight. Each common narrow wall 11 and 13, respectively, is provided with a quadrature phase shift directional coupler hybrid A and B, respectively, while each common wide wall 12 and 14, respectively, is provided with another directional coupler hybrid C and D, respectively, having similar phase shift characteristics. The four waveguides are provided with input terminals I–1, I–2, I–3, and I–4, respectively, lying in the same plane perpendicular to the axis of parallelism of the waveguide, and couplers A and B are disposed at one distance, while couplers C and D are disposed at another distance further removed from these input terminals. The remaining ends of the four waveguides are the output terminals, designated O–1, O–2, O–3 and O–4, respectively.

Couplers A and B each consists of a plurality of longitudinally disposed slots 21, cut in the respective narrow wall 11 or 13, in which the coupler is disposed. Couplers C and D each consist of a plurality of transversely directed slots 22 centered substantially along the center line of the wall 12 or 14, respectively, in which they are cut, and a plurality of longitudinally directed slots 23 disposed near the edges of the wall. Couplers C and D are of the kind which is described in detail and claimed in copending application Serial No. 784,277, filed Novmber 5, 1947. It will be recognized by those skilled in the art that when the fundamental or $TE_{0,1}$ mode of wave propagation exists in the various waveguides, the individual slots 21, 22 and 23 of the couplers are each disposed perpendicular to the direction of current flow in the wall in which it is cut, so that each slot is disposed advantageously to be excited by this mode. The slots of couplers C and D are preferably made thin, to the extent that each slot will be excited principally by that field which gives rise to a current tending to flow across its long dimension, and no other.

The coupling ratio of each coupler is adjusted to unity, so that each coupler functions as a "hybrid," and couples substantially one-half of the power presented to it. To this end the slots of each coupler are made non-resonant to waves in the operating frequency band, so that each slot couples only a small amount of the power presented to it, and the number of slots of each coupler is then chosen to effect a coupling ratio of unity. In order that the coupling ratio shall remain reasonably constant over the operating frequency band, all the slots are maintained short with respect to the longest guide wavelength being coupled; the slot lengths should not be equal to or exceed one half the longest guide wavelength in the band. With respect to couplers C and D, these features of construction are explained in detail in the aforementioned copending application, where the form of coupler in which the coupling ratio is unity is referred to as a "bridge circuit." As developed in said copending application, the spacing between slots of couplers like C and D has little or no effect on the coupling ratio, but there is an improvement in directivity when the spacing is reduced, as in the embodiment illustrated in Fig. 11 of said application. The same is generally true of couplers like A and B. The coupling ratio is determined by the nature of the individual slots and the number of slots employed in each coupler. Couplers like A and B, or C and D are characterized by extremely broad bandwidth.

Each of the directional couplers is a quadrature phase shift device, that is, the output voltages differ in phase by 90 degrees. In this respect the directional couplers employed in the present invention differ from the magic T or rat race bridge, which are characterized by phase shifts of 180 degrees or zero. The quadrature nature of the present directional couplers is due mainly to their symmetry. For example, coupler A couples two identical waveguides symmetrically; that is, the same mechanical and electrical configuration is presented to waves on either side of the coupler.

Figure 3A:
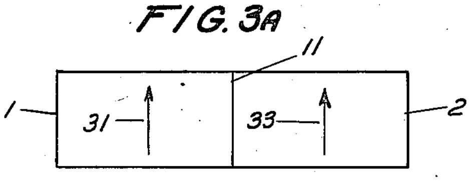
Figure 3B:
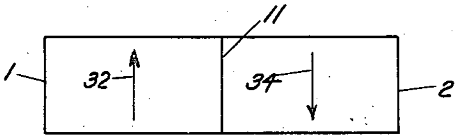

Considering now coupler A in the absence of couplers C and D, if coupler A were infinitely directive, an ideal situation which is not fully realized but is closely approached in practice, all the power incident upon either of input terminals I–1 or I–2 would become available at the output terminals O–1 and O–2, in equal amounts because the coupler is a hybrid. The ideal situation can be synthesized by introducing two separate sets of waves into the two input terminals, as illustrated in Figs. 3A and 3B. As shown in Fig. 3A, two waves of equal intensities and symmetrical with respect to the common wall 11 wherein the coupler A exists, represented by vectors 31 and 33, are introduced into or incident upon the first and second waveguides 1 and 2, at input terminals I–1 and I–2, respectively. Simultaneously, as shown in Fig. 3B, two additional waves, antisymmetric with respect to the common wall 11, represented by vectors 32 and 34, are incident upon the input terminals I–1 and I–2, respectively. The symmetric vectors 31 and 33 are cophased at all times and the antisymmetric vectors 32 and 34 are mutually oppositely phased at all times, as seen from the common wall 11. Vector 32 is in phase with vector 31, in consequence of which vector 34 is oppositely phased to vector 33. Thus, at input terminal I–1, a voltage exists, which is the sum of two cophased voltages, represented by vectors 31 and 32, while the voltage at input terminal I–2 is zero, being the sum of two opposed-phased voltages of equal magnitude, represented by vectors 33 and 34. This is the physical situation that exists at the input terminals I–1 and I–2 when the directivity of the coupler A is ideal, or infinite, and power is introduced at terminal I–1.

Figure 4A:
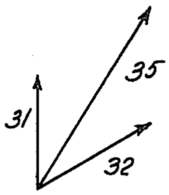
Figure 4B:
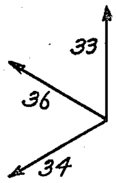

Consider now the condition of the four vectors 31, 32, 33 and 34 at the output terminals O–1 and O–2, remembering that the couplers C and D are considered as absent. Assuming no reflections, which is the case for ideal performance, i. e. infinite directivity, and perfect matching, as well as perfect symmetry of the two paths in the waveguides 1 and 2, all the incident voltages will proceed through the respective waveguides into which they were introduced and arrive at these output terminals with equal magnitudes, except for very small line attenuations affecting all the voltages equally. However, at the coupler A, the two waveguides 1 and 2 become in effect one waveguide of different dimensions due to the slots 21 cut in the common wall 11, and vectors 31 and 33 generate, in effect, a symmetrical mode of transmission in the two coupled waveguides while vectors 32 and 34 generate, in effect, an antisymmetric mode. In general, these two coupling modes have different phase velocities in the waveguides at the coupler. Thus, while vectors 31 and 33 maintain their initial symmetry, and vectors 32 and 34 maintain their initial antisymmetry, the phase relation between vectors of one coupling mode and those of the other coupling mode is changed by the coupler, the amount of change depending on the length of the coupler, and is different at the output terminals O–1 and O–2 from the relation that existed at the input terminal I-1 and I-2. This situation is illustrated in Figs. 4A and 4B, where vectors 31 and 33 are still cophased, and vectors 32 and 34 are still mutually oppositely phased, but vector 32 has been shifted in phase with respect to vector 31, and vector 34 has been shifted in phase with respect to vector 33 by the same amount and in the same direction. The vectors in the first output terminal O-1 (Fig. 4A) have a resultant phase illustrated by vector 35, while the vectors in the second output terminal O-2 (Fig. 4B) have a resultant phase illustrated by vector 36. The phase difference between the two resultants is 90 degrees, and this is true regardless of the kind of symmetrical directional coupler that is used, or the frequency of operation.

Figure 5A:
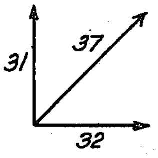
Figure 5B:
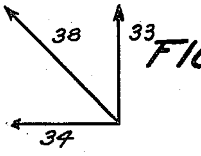

Since the symmetrical directional couplers that are employed in the invention are hybrids, the power levels at the two output terminals are equal. In Figs. 4A and 4B, vectors 35 and 36 are not equal, illustrating a non-hybrid coupling condition. In Figs. 5A and 5B, the hybrid condition, arrived at the proper adjustment of the length of the coupler, as discussed above, is illustrated. Vectors 31 and 32, and 33 and 34 have proceeded through a sufficient length of coupler A to have shifted the vectors of one coupling mode by 90 degrees with respect to the vectors of the other coupling mode. The resultants 37 and 38 are equal, and still 90 degrees apart. Thus, when the coupler A is a hybrid, it may be said to have an electrical length which is 90 degrees different for one coupling mode than for the other. This is not to be confused with the fact that whether or not the coupler is a hybrid, the two components of a voltage that is divided by it are always in phase quadrature, in consequence of which the hybrid form of the coupler may be termed a "quadrature hybrid."

The foregoing discussion with respect to coupler A applies, as far as it has proceeded, with equal force to couplers B, C, and D; that is, each coupler is a quadrature phase difference device. The sense of this phase difference, however, depends on the nature of the coupler and its length. Considering again the two coupling modes which appear to exist at the coupler A, the phase velocity of the mode (vectors 32 and 34) that is antisymmetric as viewed from the common wall 11 has been found to be substantially unaffected by the coupler, so that, in effect, this mode does not "see" the coupler; while the phase velocity of the other mode (vectors 31 and 33), which is symmetric as seen from the common wall 11, has been found to tend toward the free-space velocity of electromagnetic waves. This being a slower velocity, the guide wavelength of the symmetric mode is shorter than that of the antisymmetric mode. Therefore, a coupler which is one wavelength long for the antisymmetric mode is simultaneously one and some fraction wavelengths long for the symmetric mode. Considering that the length of coupler A is such that the phase shift introduced between coupling modes is 90 degrees or less, it is seen that, in Fig. 4A, vector 31 leads vector 32. Thus, in Figs. 4A and 4B, and in Figs. 5A and 5B, a counter-clockwise rotation of one vector with respect to another indicates a phase advance. It is now seen that, of the resultant vectors 35 and 36, the latter leads the former in phase. When the length of the coupler A is exactly 90 degrees or one quarter wavelength greater for the symmetric than for the antisymmetric mode, vector 31 advances exactly 90 degrees with respect to vector 32, as shown in Fig. 5A, and vector 33 advances exactly 90 degrees with respect to vector 34, as shown in Fig. 5B. Continued lengthening of coupler A toward the point where it is 180 degrees longer for the symmetric than for the antisymmetric mode will advance vector 31 another 90 degrees to a point of opposite sense with respect to vector 32, so that the resultant vector 35 is reduced to zero, and will correspondingly advance vector 33 by 90 degrees with respect to vector 34 so that the two are additive algebraically, and the resultant vector 36 reaches a maximum. For coupler A this is the physical condition wherein all the power that is introduced into input terminal I-1 appears in the output terminal O-2 of the coupled waveguide, and none appears in the other output terminal O-1. It should be obvious that further lengthening of the coupler A, so that its length lies in the region where it is greater than 180 but less than 360 degrees longer for the symmetric than for the antisymmetric mode, results in vector 36 lagging vector 35 by 90 degrees. Thus, it may be said that in the first two quadrants (the region where coupler A is between 0 and 180 degrees longer for the symmetric than for the antisymmetric mode), coupler A introduces a 90-degree phase lead in the coupled voltage, whereas in the second two quadrants (the region where coupler A is between 180 and 360 degrees longer for the symmetric than for the antisymmetric mode), coupler A introduces a 90-degree phase lag in the coupled voltage.

Figure 6A:
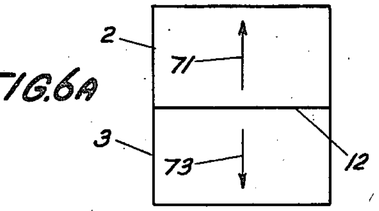
Figure 6B:
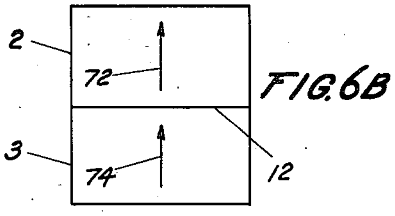

Consider now couplers like C and D, which differ from couplers like A and B in that they are cut in a common wide wall, rather than a common narrow wall. Figs. 6A and 6B illustrate diagrammatically the second and third waveguides 2 and 3, which share the common wide wall 12, wherein coupler C exists. As was done in the case of coupler A, the input terminal condition for an ideal directional coupler having power introduced at input terminal I-2 is synthesized by introducing a pair of oppositely phased voltages, represented by vectors 71 and 73, into the input terminals I-2 and I-3, respectively, as shown in Fig. 6A, and simultaneously introducing a pair of cophase voltages, represented by vectors 72 and 74, into the same respective input terminals. The voltages all have the same magnitudes, and those in input terminal I-2 are cophase, so that those in the other input terminal I-3 are mutually oppositely phased. Thus, at the input terminals, a voltage exists at I-2 and zero voltage exists at I-3, which is the desired input terminal condition.

Figure 7A:
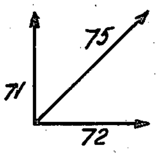
Figure 7B:
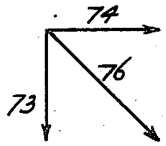

The vectors 71 and 73 that appear in Fig. 6A are symmetric with respect to the common wall 12, in that, seen from this wall, they are in the same condition at any one instant. Although, as drawn, these two vectors appear to be oppositely phased, or antisymmetric, it is only important that they be symmetric as seen by the coupler C, which is in the common wall 12. Correspondingly, the vectors 72 and 74, in Fig. 6B, are antisymmetric with respect to the coupler C. As in the case of coupler A, the mode of transmission which is generated at coupler C by the antisymmetric vectors 72 and 74 is substantially unaffected in phase velocity by the coupler, while the mode that is generated at the coupler by the symmetric vectors 71 and 73 is reduced in phase velocity toward the free space velocity of electromagnetic wave energy. Thus, in Figs. 7A and 7B, which illustrate a hybrid case of the vectors 71 and 72 which entered terminal I–2 with no phase difference between them, vector 71 has been advanced 90 degrees by the coupler C with respect to vector 72 (Fig. 7A); and of the vectors 73 and 74 which entered terminal I–3 with 180 degrees of phase difference between them, vector 73 has been advanced 90 degrees by the coupler C with respect to vector 74 (Fig. 7B). The resultant voltages that are present in the two output terminals O–2 and O–3 are represented by vectors 75 and 76, respectively. These are 90 degrees apart, but vector 76 lags behind vector 75. It should now be apparent from a comparison of Figs. 5A and 5B with Figs. 7A and 7B, respectively, that the sense of the phase change introduced by couplers like C and D, namely, common wide wall couplers, will always be opposite to the sense of the phase change introduced by common narrow wall couplers of equivalent length. In the first two quadrants of coupler length, the voltage that appears in the coupled waveguide output terminal lags, and in the second two quadrants, the coupled voltage leads the voltage in the main or input waveguide. It will be convenient for the purposes of the discussion that follows to term the common narrow wall type couplers A and B "positive" or (+) couplers, and the common wide wall type couplers C and D "negative" or (−) couplers, with respect to the senses of their respective phase shifts.

Referring now to Fig. 8, the circuit of the invention is shown in a complete radar system. The circuit proper is illustrated in a flow diagram, showing power flow paths between input and output terminals. A pulsed transmitter 41 applies radio frequency power pulses to input terminal I–2 via a duplexer 42. A range receiver 43 is connected to the same input terminal I–2 through the duplexer, in a well-known fashion. An elevation receiver 44 is connected to input terminal I–3, and an azimuth receiver 45 is connected to input terminal I–1. Input terminal I–4 is terminated in a non-reflective termination 46, so that substantially no energy that emerges therefrom will be reflected back into this terminal. Various suitable terminations are known to the art, among them being that shown in Fig. 8A, comprising a block of dielectric material 47 which closes the terminal I–4 and presents a sloping face 48 to incident waves, and is provided on this face with a layer 49 of resistive material, such as colloidal graphite, known as "Aquadag." The output terminals O–1, O–2, O–3, and O–4 are each connected to one of the feeds 51, 52, 53 and 54, respectively, of an antenna 50. The feeds are arranged in two sets of conjugate pairs in the same fashion as the waveguides 1, 2, 3 and 4, respectively, of the lobing circuit, with one pair of the feeds, 51 and 52, disposed horizontally side by side and the other pair of the feeds, 53 and 54, also disposed horizontally side by side, and vertically above the first pair. For reasons that will be presently explained, a 90-degree delay device 56 or 57 is included in each of the connections between output terminals O–2 and feed 52, and O–4 and feed 54, respectively, while a 180-degree delay device 58 is included in the connection between output terminal O–1 and feed 51. Each delay device may, for example, be a section of waveguide of adjustable length.

Figure 9:
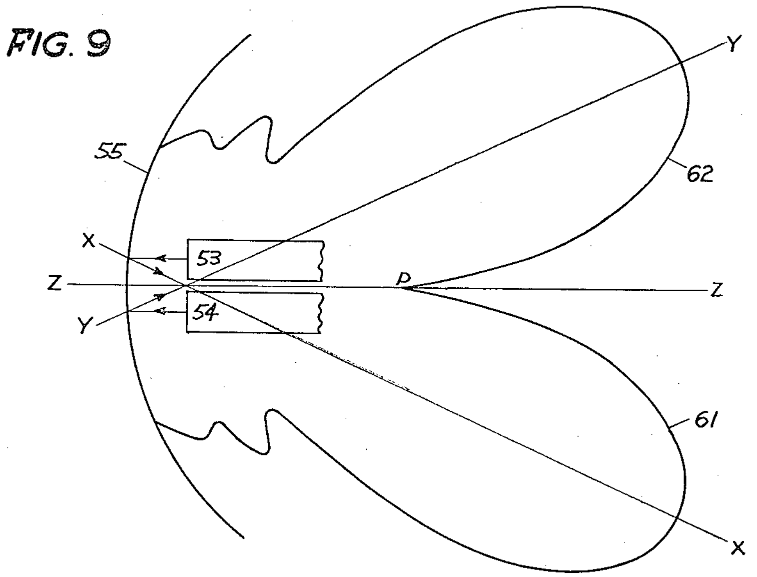
Fig. 9 is a diagrammatic sketch illustrating the lobe patterns of the individual antenna elements.

In practice, as stated above, the four antenna feeds 51, 52, 53 and 54 will usually be found in cooperative relation with a focussing device, such as the reflector 55 shown in Fig. 9. The reflector has an optic axis Z—Z, and the feeds are uniformly distributed about this axis and parallel to it. Fig. 9 shows one horizontally disposed pair of feeds 53 and 54, below which but not showing are the feeds 52 and 51, respectively, of the conjugate pair. The feeds 53 and 54 are on opposite sides of the optic axis Z—Z, so that each individually produces or receives energy in a lobe 61 or 62, respectively, on a particular axis X—X or Y—Y, respectively. The lobes overlap and occupy the same space between a point P on the optic axis Z—Z and the reflector 55.

Figure 11:
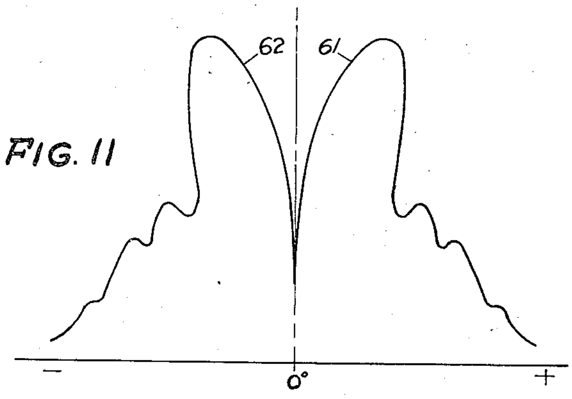
Fig. 11 illustrates the split lobe pattern of the antena array.
Figure 10:
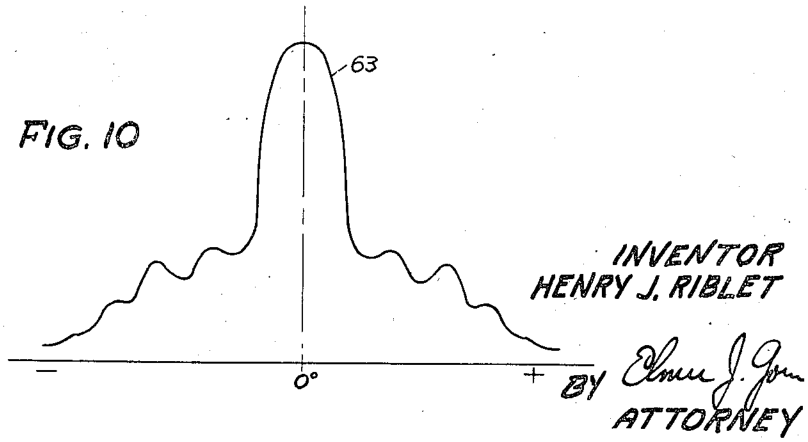
Fig. 10 illustrates the single lobe pattern of the array.

When the feeds 53 and 54 are simultaneously excited in the same phase, the antenna system of Fig. 9 has a single lobe pattern, of the nature shown in Fig. 10, where the single lobe 63 is aimed ahead, centered about the zero degree point. This is due to the fact that the energy of one lobe is added to that of the other in the overlapping region. When the two feeds 53 and 54 are excited simultaneously but 180 degrees out of phase with each other, the energy of one lobe cancels that of the other lobe in the overlapping region, as shown in Fig. 11, so that the two lobes 61 and 62 have a sharp null at the zero degree point. This provides two lobes of a character that is useful for simultaneous lobe comparison to determine the azimuth of an object or target. The same treatment with respect to the vertically disposed pairs of feeds, 52 and 53, and 51 and 54, provides two simultaneous lobes for comparison to determine elevation information. The single lobe configuration is useful for range determination. The arrangement of Fig. 8 provides for the extraction from the antenna system of range, elevation, and azimuth information simultaneously, as will become apparent.

Figure 12:
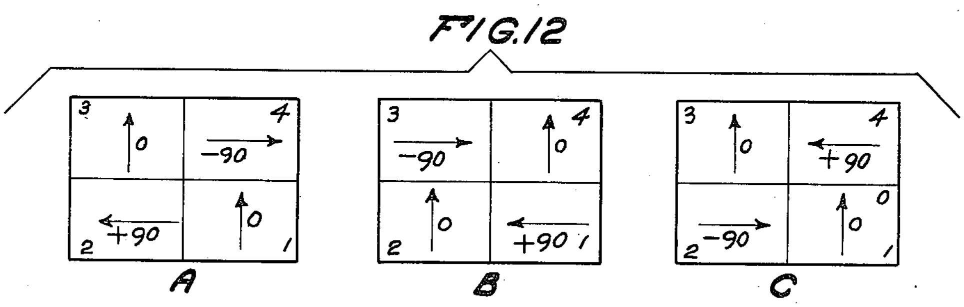
Figure 13:
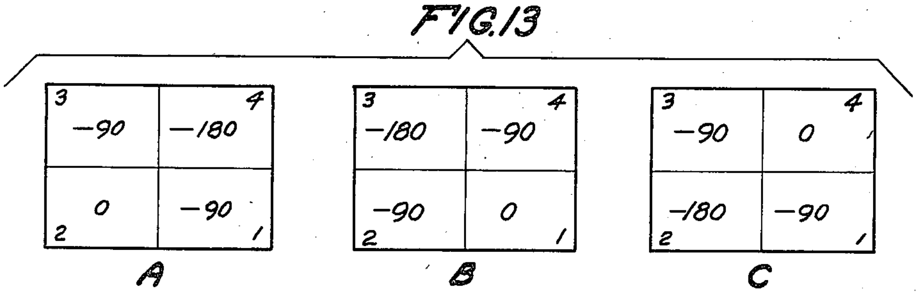

Referring now to Fig. 12, and particularly to Fig. 12A, consider that wave energy of a certain voltage is incident upon input terminal I–1. The phase of the portion of this voltage that reaches the output terminal O–1 is the reference phase, indicated by an upwardly directed vector labelled "0" in the first waveguide 1. The incident voltage wave encounters the positive directional coupler A (in Fig. 8) and half of the energy enters the second waveguide 2. The coupled voltage is advanced in the coupler by 90 degrees, as indicated by a left-hand directed vector labelled "+90" in the output terminal O–2 of the second wave guide 2. Half of the energy in the first waveguide 1 reaches negative directional coupler D, through which half of the half, or one quarter of the whole, energy is coupled into the fourth waveguide 4, where the voltage is delayed in the coupler by 90 degrees, as indicated by a right-hand directed vector labelled "−90" in the output terminal O–4 of the fourth waveguide 4. The half of the energy in the second waveguide 2 encounters negative directional coupler C, where half of it or one quarter of the whole enters the third waveguide 3, with the voltage delayed in the coupler by 90 degrees, so that its phase is zero degrees different from that in waveguide 1, as indicated by an upwardly directed vector labelled "0" in the output terminal O–3 of the third waveguide 3. The energy that is incident upon input terminal I–1 is thus split into four equal parts in the outputs of the four waveguides, of which the voltages in the first and third waveguides 1 and 3 are in the same phase, and the voltages in the second and fourth waveguides 2 and 4 are respectively 90 degrees ahead and 90 degrees behind said same phase. Fig. 13A shows this relative phase situation at the four output terminals. For convenience, the most advanced phase, namely, the phase of the output voltage at O–2, has been chosen as the reference phase, so that the phases of the voltages at O–1 and O–3 are —90 degrees with respect thereto, and the phase of the voltage at O–4 is —180 degrees with respect thereto.

Fig. 12B illustrates the phase situation that exists with respect to the output voltage vectors in the four output terminals when the power is incident upon the input I–2 of the second waveguide 2. Here the voltage vector in the output terminal O–2 of the second waveguide 2 has the reference phase, and is therefore labelled "0." The incident power is split first by positive coupler A, where half of it enters the first waveguide 1, the voltage being advanced in phase by 90 degrees, as indicated by a left-hand directed vector labelled "+90" in the output terminal O–1 of the first waveguide 1. The voltage of the portion of the power that enters the fourth waveguide 4 through negative coupler D is delayed by 90 degrees, however, so that the vector shown in the output O–4 of waveguide 4 is labelled "0." Incident power from the second waveguide 2 also enters the third waveguide 3 through negative coupler C, which introduces a 90-degree delay, indicated by a right-hand directed vector labelled "—90" in the output O–3 of the third waveguide 3. There results a division of the power among the four waveguides such that the voltages of the components thereof are in the same phase in the outputs of the second and fourth waveguides 2 and 4, and lag and lead said same phase by 90 degrees in the outputs of the third and first waveguides 3 and 1, respectively. Fig. 13B shows this relative phase situation at the four output terminals. For convenience the most advanced phase, namely, the phase of the output voltage at O–1, has been chosen as the reference phase, so that the phases of the voltages O–2 and O–4 are —90 degrees with respect thereto, and the phase of the voltage at O–3 is —180 degrees with respect thereto.

Fig. 12C illustrates the situation that exists with respect to the output voltage vectors in the four output terminals when the power is incident upon the input I–3 of the third waveguide 3. As should now be evident, there results a division of power among the four waveguides such that the components thereof are in the same phase in the outputs of the first and third waveguides 1 and 3, and lag and lead said same phase in the outputs of the second and fourth waveguides 2 and 4, respectively. Fig. 13C shows this relative phase situation at the four output terminals. For convenience the most advanced phase, namely, the phase of the output voltage at O–4, has been chosen as the reference phase, so that the phases of the voltages at O–1 and O–3 are —90 degrees with respect thereto, and the phase of the voltage at O–2 is —180 degrees with respect thereto.

In each of the three foregoing cases, the power is divided into four equal parts among the four output terminals O–1, O–2, O–3 and O–4.

Figure 14:
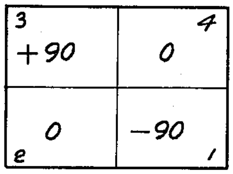
Figure 15:
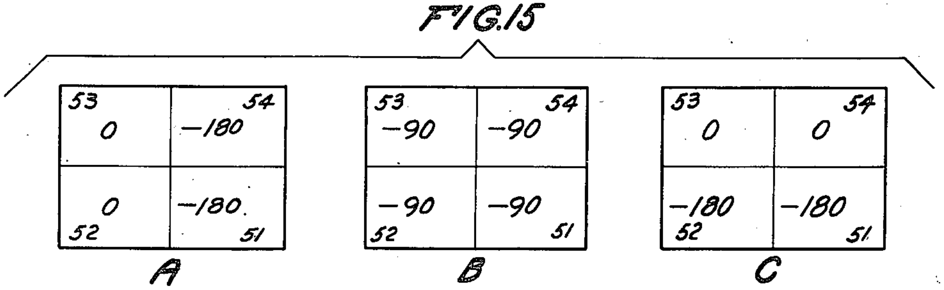

Referring now to Fig. 15, it is desired that when the incident power is in the first input terminal I–1, the output voltages shall be in one phase in the left-hand pair of antenna feeds 52 and 53, and in the opposite phase in the right-hand or conjugate pair of feeds 51 and 54, as shown in Fig. 15A; that when the incident power is in the second input terminal I-2, the output voltages shall be in the same phase in all the antenna feeds, as shown in Fig. 15B; and that when the incident power is in the third input terminal I–3, the output voltage shall be in one phase in the upper pair of antenna feeds 53 and 54, and in the opposite phase in the lower or conjugate pair of feeds 51 and 52, as shown in Fig. 15C. Since the lobe configuration of the antenna is the same regardless of whether it is being used for transmitting or receiving, an arrangement that satisfies these conditions will provide that, during reception, a double lobe pattern like that of Fig. 11 will be seen from each of terminals I-1 and I–3, one split horizontally, and one split vertically, so that azimuth information will be available at terminal I–1, and elevation information will simultaneously be available at terminal I–3; and that simultaneously the single lobe pattern of Fig. 10 will be seen from terminal I-2, which is connected to the range receiver. The required arrangement may be arrived at by inserting between the antenna feed system and certain of the output terminals a fixed phase shift of the kind shown in Fig. 14 where, relative to each other, the second and fourth waveguides 2 and 4 have the same amount of phase shift, and the first and third waveguides 1 and 3 provide a phase delay and a phase advance of 90 degrees, respectively. It will be seen that if the effect illustrated in Fig. 14 is applied in turn to the situations illustrated in Figs. 13A, 13B and 13C, the situations illustrated in Figs. 15A, 15B and 15C, respectively, result. The effect illustrated in Fig. 14 can be obtained by inserting the 90-degree delay devices 56 and 57 between output terminals O–4 and O–2 and their respective antenna feeds 54 and 52, and the 180 degree delay device 58 between output terminal O–1 and its antenna feed 51.

It will be noted that the effect illustrated in Fig. 14 is such as to cause the lobing circuit to function as though no relative phase shifts were introduced among the antenna feeds by the couplers when power is incident at I-2. This is apparent upon a comparison of Fig. 14 with Fig. 12B.

Fig. 16 illustrates another embodiment of the invention wherein all the directive couplers are of the negative type. A fraction only of the lobing circuit is shown, the input and output terminals being omitted. The four coupled waveguides 81, 82, 83, and 84 correspond respectively to the first, second, third, and fourth waveguides 1, 2, 3, and 4, respectively, in Fig. 1. The members of each pair of one set of conjugate pairs of waveguides are coupled through common wide walls at one point in the circuit and the members of each pair of the other set of conjugate pairs are coupled through common wide walls at another point in the circuit. Thus, near one end of the circuit, the first and fourth waveguides 81 and 84, forming one pair of waveguides, share a common wide wall, through which they are coupled by a directional coupler E, and the other two waveguides 82 and 83, forming the conjugate pair, share a common wide wall through which they are coupled by another directional coupler F. This end of the circuit is the end that is nearer to the transmitter and receivers. Near the other or antenna end of the circuit, the first and second waveguides 81 and 82, forming another pair of waveguides, share a common wide wall, through which they are coupled by a directional coupler G, and the conjugate pair of waveguides 83 and 84 share a common wide wall through which they are coupled by another directional coupler H. Since each directional coupler is in a common wide wall, it is of the negative type. The couplers E, F, G, and H are all of the same kind as couplers C and D in Fig. 1, which kind is preferred when a high degree of precision is to be attained. As is evident in Fig. 16, the four waveguides are made to share common wide walls first between the members of one set of conjugate pairs and then between the members of the other set by providing each waveguide with a gradual 90-degree twist about its longitudinal axis between the coupling regions. The circuit that results from this construction is illustrated in Fig. 17.

In Fig. 17, the input terminals I–1, I–2, I–3, and I–4 are connected to waveguides 81, 82, 83, and 84, respectively, which are in turn connected to the output terminals O–1, and O–2, O–3, and O–4, respectively, so that the waveguides 81, 82, 83, and 84 are in the same places in the circuit as waveguides 1, 2, 3, and 4 in Fig. 8. The input terminals are all connected into the complete radar system the same way as in Fig. 8, and these connections are not duplicated in Fig. 17. The antenna feeds 51, 52, 53, and 54 are connected to the same output terminals O–1, O–2, O–3, and O–4, as in Fig. 8. For reasons that will soon become apparent, 90-degree delay devices 86 and 87 are connected between output terminals O–1 and O–3, respectively, and their respective antenna feeds, 51 and 53, and a 180-degree delay device 88 is connected between output terminal O–2 and its antenna feed 52. These delay devices correspond in purpose to the delay devices 56, 57, and 58 shown in Fig. 8.

An analysis of Fig. 17 similar to that set forth above in connection with Fig. 8 will show that, when power is incident upon input terminal I–1, the resultant voltages at the four output terminals are so phased that the voltages at O–2 and O–4 lag that at O–1 by 90 degrees, and the voltage at O–3 lags that at O–1 by 180 degrees, as shown in Fig. 18A. This is readily apparent, for power that arrives at O–2 or O–4 from I–1 goes through one coupler, G or E, respectively, while power that arrives at O–3 from I–1 goes through two couplers, E and H successively. Since each coupler is negative, each introduces a 90-degree voltage delay. Of course, power that arrives at O–1 from I–1 goes through no couplers. Similarly, when power is incident upon input terminal I–2, the resultant voltages at the four output terminals are so phased that the voltages at O–1 nad O–3 lag the voltage at O–2 by 90 degrees, and the voltage at O–4 lags that at O–2 by 180 degrees, as shown in Fig. 18B. Also, as shown in Fig. 18C, when power is incident upon input terminal I–3, the resultant voltages at the four output terminals are so phased that the voltages at O–2 and O–4 lag the voltage at O–3 by 90 degrees, and the voltage at O–1, being two couplers (F and G) removed, lags that at O–3 by 180 degrees.

To obtain the desired phase configurations at the antenna 50, a fixed phase change is effected in the output connections to provide the effect illustrated in Fig. 19. This effect is derived in accordance with the fact noted in connection with Fig. 14, above, namely, that it should cause the lobing circuit to function as though no relative phase shifts were introduced among the antenna feeds by the couplers when power is incident at I–2. Accordingly, referring to Fig. 18B, there should be a 90-degree delay in the output circuit from O–2 to feed 52 and a 90-degree advance in the output circuit from O–4 to feed 54 to bring all the output voltages into the same phase for power incident at I–2. This results in the phase condition illustrated in Fig. 20B, which is the condition for transmission and range determination. For azimuth determination, the phase condition of Fig. 20A is desired, and this is readily obtained by applying the effect of Fig. 19 to Fig. 18A. For elevation determination the phase condition of Fig. 20C is desired, and this, too, is readily obtained by applying the effect of Fig. 19 to Fig. 18C. Thus it is shown that the embodiment shown in Fig. 16 can be made to function in the same manner as that shown in Fig. 1 in the same radar system by simple substitution therein, with the proper phasing devices, but with no other changes in the radar system itself. The phase effect shown in Fig. 19 can be readily obtained with the delay devices 86, 87, 88, shown in Fig. 17.

The invention can be constructed in many ways, with various combinations of positive and negative directional couplers. In any case, it will be a simple matter to determine a fixed phase correction arrangement like those of Figs. 14 and 19 for the construction chosen. In general the phase effect necessary to effect the corrections desired will have the form of Fig. 14 or Fig. 19 with algebraic signs the same as shown in those figures, or interchanged. From the foregoing analysis of certain embodiments of the invention, certain general characteristics thereof become apparent. The invention may be regarded as a circuit of four transmission lines directionally coupled together in such a fashion that when power is introduced into one line, the power is divided and one half of it is directionally coupled into a second line. Subsequently, the half remaining in said one line is divided in another coupler and a quarter portion is directionally coupled into a third line; while the half that is in the second line is divided in a third coupler and one quarter of the whole is directionally coupled into the fourth line. Emerging from the four lines are four separate output powers, equal in magnitude, but differing in relative phase. It can be shown that if a fixed phase shift or adjusting arrangement is applied at certain of the outputs to cophase the outputs when power is introduced into the input terminal of one line, then when power is introduced into the input terminal of one or the other of the two lines that are immediately coupled to said one line, namely, the immediate neighbors, the four outputs are suitably phased for simultaneous lobe comparison in one predetermined plane or a second predetermined plane at right angles thereto, namely, azimuth or elevation. Thus, it has been shown that when the outputs are phased to provide a single lobe antenna pattern when power is introduced into I–2, power introduced into I–1 and I–3 provides simultaneous lobe pairs, the former suitable for azimuth determination, and the latter suitable for elevation determination. Further analysis like the foregoing will show that if the outputs were phased to provide the single lobe pattern when power is fed into I–3, for example, then power introduced into I–2 and I–4 would provide the suitable double lobe patterns, for elevation and azimuth determination, respectively. In this case I–1 would be terminated with a non-reflective termination. On the other hand, if the outputs were phased to provide the single lobe pattern when power is fed into I-4, then power introduced into I-3 and I-1 would provide the suitable double lobe patterns, for azimuth and elevation determination, respectively. Here I-2 would be terminated with a non-reflective termination. Lastly, if the outputs were phased to provide the single lobe pattern when power is fed into I-1, then power introduced into I-4 and I-2 would provide the suitable double lobe patterns, for elevation and azimuth determination, respectively; and I-3 would be terminated with the non-reflective termination. As has been pointed out, the circuit can in any case be employed in the reverse direction, that is, for reception, since it is symmetrical as to direction. Hence, when the fixed phase-adjust arrangement is set up to provide range information from one of the four lines, the azimuth and elevation information will automatically become available from the two lines that are immediately coupled thereto.

The fixed phase adjustment can be effected with any suitable arrangement. Although delay devices have been illustrated, it should be understood that phase advancing devices are available, also; that is, the phase of the voltage at one output terminal can be advanced with respect to that at another. One suitable means for accomplishing this is a section of rectangular waveguide having a reduced large cross-sectional dimension. Since the phase velocity of waves travelling in a rectangular waveguide is known to be increased as this dimension is reduced, such a section in one of the output connections to an antenna element will cause a relative advance in phase of the voltage present in that element with respect to the other voltages. It is not believed to be necessary to illustrate such a device, as it is well known, and its details form no part of the invention.

Many other variations and equivalents within the spirit of the invention will occur to those skilled in the art. It is accordingly intended that the following claims shall be limited only by the prior art, and not by the details of the embodiment of the invention described herein.

What I claim is:

1. A radio frequency transmission line circuit comprising: first, second, third and fourth transmission line sections arranged in two sets of conjugate pairs; and four quadrature directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines.

2. A radio frequency transmission line circuit comprising: first, second, third and fourth transmission line sections arranged in two sets of conjugate pairs; and four directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines.

3. A radio frequency transmission line circuit comprising: first. second, third and fourth transmission line sections arranged in two sets of conjugate pairs; and four symmetrical directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines.

4. A radio frequency transmission line circuit comprising: first, second, third and fourth transmission line sections arranged in two sets of conjugate pairs; and four symmetrical directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby coupled to two other lines, and means in said lines for bringing into substantially the same phase all the voltages present in said end as a result of the introduction of a voltage into one of said sections at the other end.

5. A radio frequency transmission line circuit comprising: first, second, third and fourth transmission line sections arranged in two sets of conjugate pairs; and four quadrature hybrid directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines.

6. A radio frequency transmission line circuit comprising: four transmission line sections arranged in two sets of conjugate pairs; and four directional couplers, each coupling a separate pair of said lines, each line being thereby coupled to two other lines, the couplers coupling the pairs of one set of conjugate pairs being disposed in a different location in said circuit from the couplers coupling the pairs of the other set of conjugate pairs.

7. A radio frequency transmission line circuit comprising: four parallel transmission line sections arranged in two sets of conjugate pairs, each line having an input end and an output end, the input ends lying in the same plane transverse to the axis of parallelism; and four directional couplers, each coupling a separate pair of said lines, each line being thereby coupled to two other lines, the couplers coupling the pairs of one set of conjugate pairs being disposed nearer to said plane than the couplers coupling the pairs of the other set of conjugate pairs.

8. A radio frequency transmission line circuit comprising: four parallel transmission line sections arranged in two sets of conjugate pairs, each line having an input end and an output end, the input ends lying in the same plane transverse to the axis of parallelism; and four symmetrical directional couplers, each coupling a separate pair of said lines, each line being thereby coupled to two other lines, the couplers coupling the pairs of one set of conjugate pairs being disposed nearer to said plane than the couplers coupling the pairs of the other set of conjugate pairs, and phase-shift means in said output ends to provide like-phased output voltages in response to a voltage incident upon a prescribed one of said input ends.

9. A radio frequency transmission line circuit comprising: four parallel transmission line sections arranged in two sets of conjugate pairs, each line having an input end and an output end, the input ends lying in the same plane transverse to the axis of parallelism; and four quadrature hybrid directional couplers, each coupling a separate pair of said lines, each line being thereby coupled to two other lines, the couplers coupling the pairs of one set of conjugate pairs being disposed nearer to said plane than the couplers coupling the pairs of the other set of conjugate pairs, and phase-shift means in said output ends to provide like-phased output voltages in response to a voltage incident upon a prescribed one of said input ends.

10. A radio frequency transmission line circuit comprising: first, second, third and fourth sections of substantially identical rectangular waveguides arranged mutually parallel in two sets of conjugate pairs; and four quadrature directional couplers, each coupling a separate pair of said sections, said first section being thereby coupled to said second section at a first region in said first and second sections and to said third line at a second different region in said first and third sections removed along said sections from said first region, said second section being coupled to said fourth section at said second region in said second and fourth sections, and said fourth section being coupled to said third section at said first region in said third and fourth sections, each section being thereby sequentially coupled to two other sections.

11. A radio frequency transmission line circuit comprising: first, second, third and fourth sections of substantially identical rectangular waveguides arranged mutually parallel in two sets of conjugate pairs, each section sharing a common wall with one other section and a common wall with a different other section; and four quadrature directional couplers, each coupling a separate pair of said sections through a common wall said first section being thereby coupled to said second section at a first region in said first and second sections and to said third line at a second different region in said first and third sections removed along said sections from said first region, said second section being coupled to said fourth section at said second region in said second and fourth sections, and said fourth section being coupled to said third section at said first region in said third and fourth sections.

12. A radio frequency transmission line circuit comprising: four sections of substantially identical rectangular waveguides arranged mutually parallel in two sets of conjugate pairs, each section sharing a common wide wall first with a first of the remaining sections in a first region in said sections and then with a second of the remaining sections in a second region in said sections removed along said sections from said first region; and four directional couplers, each coupling a separate pair of said sections through a common wall.

13. A radio frequency transmission line circuit comprising: four sections of substantially identical rectangular waveguides arranged mutually parallel in two sets of conjugate pairs, each section sharing a common wide wall with one other section and a common narrow wall with a different section; and four quadrature directional couplers, each coupling a separate pair of said sections through a common wall, the couplers in the common wide walls being disposed in a first region in said sections and the couplers in the common narrow walls being disposed in a second region removed along the sections from said first region.

14. A radio frequency transmission line circuit comprising: four sections of substantially identical rectangular waveguides arranged mutually parallel in two sets of conjugate pairs, each section sharing a common wall with one other section and a common wall with a different section; each section having an input end and an output end, the input ends lying in a common plane transverse to the axis of parallelism of said section; and four directional couplers, each coupling a separate pair of said sections through a common wall; the couplers coupling the pairs of one set of conjugate pairs being disposed nearer to said plane than the couplers coupling the pairs of the other set of conjugate pairs.

15. A radio frequency transmission line circuit comprising: first, second, third and fourth transmission line sections arranged in two sets of conjugate pairs; and four quadrature hybrid directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines, each of said sections having an input end and an output end; and phase-shift means in said output ends to provide like-phased output voltages in response to a voltage incident upon a prescribed one of said input ends.

16. A radio frequency transmission line circuit comprising: first, second, third and fourth transmission line sections arranged in two sets of conjugate pairs; and four quadrature hybrid directional couplers, each coupling a separate pair of said lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, each line being thereby sequentially coupled to two other lines, each of said sections having an input end and an output end; and phase-shift means in said output ends to provide anti-symmetric output voltages from one of said sets of conjugate pairs in response to a voltage incident upon a prescribed one of said input ends.

17. A radio frequency transmission line circuit comprising: first, second, third and fourth transmission line sections; directional coupling means coupling each line to two other lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, said coupling means being thereby so located in the circuit that a voltage introduced into a first one of said lines is divided into first and second portions in a first coupler of which the first portion continues in said first line and the second portion is transferred by said coupler to a second line, said first portion is subsequently further divided in a second coupler into third and fourth portions of which the third portion continues in said first line and said fourth portion is transferred into a third line, and said second portion is subsequently divided in a third coupler into fifth and sixth portions of which the fifth portion continues in said second line and the sixth is transferred into a fourth line, whereby portions of said voltage are made available in all four of said lines.

18. A radio frequency transmission line circuit comprising: first, second, third and fourth transmission line sections; directional coupling means coupling each line to two other lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, said coupling means being thereby so located in the circuit that a voltage introduced into a first one of said lines is divided into first and second portions in a first coupler of which the first portion continues in said first line and the second portion is transferred by said coupler to a second line, said first portion is subsequently further divided in a second coupler into third and fourth portions of which the third portion continues in said first line and said fourth portion is transferred into a third line, and said second portion is subsequently divided in a third coupler into fifth and sixth portions of which the fifth portion continues in said second line and the sixth is transferred into a fourth line, whereby portions of said voltage are made available in all four of said lines, and means in said sections for bringing all of said voltages into substantially the same phase.

19. A radio frequency transmission line circuit comprising: first, second, third and fourth transmission line sections; hybrid directional coupling means coupling each line to two other lines, said first line being thereby coupled to said second line at a first region in said first and second lines in which a first coupler is disposed and to said third line at a second different region in said first and third lines removed along said lines from said first region, and in which a second coupler is disposed, said second line being coupled to said fourth line at said second region in said second and fourth lines where a third coupler is disposed, and said fourth line being coupled to said third line at said first region in said third and fourth lines, where a fourth coupler is disposed, said coupling means being thereby so located in the circuit that a voltage introduced into a first one of said lines is divided into first and second portions in a first coupler of which the first portion continues in said first line and the second portion is transferred by said coupler to a second line, said first portion is subsequently further divided in a second coupler into third and fourth portions of which the third portion continues in said first line and said fourth portion is transferred into a third line, and said second portion is subsequently divided in a third coupler into fifth and sixth portions of which the fifth portion continues in said second line and the sixth is transferred into a fourth line, whereby substantially equal voltages appear in all four of said lines.

20. A radio frequency transmission line circuit comprising: four sections of substantially identical rectangular waveguides arranged mutually parallel in two sets of conjugate pairs, each section sharing a common wide wall first with a first of the remaining sections in a first region in said sections and then with a second of the remaining sections in a second region in said sections removed along said sections from said first region; and four directional couplers, each coupling a separate pair of said sections through a common wide wall.

21. A radio frequency transmission line circuit comprising first, second, third and fourth transmission lines, each having an input end and an output end, means to introduce energy into the input end of said first line, first directional energy coupling means connected between said first and second lines dimensioned to couple substantially half the power incident thereupon from said first line input end into said second line propagating toward the output end thereof, second directional energy coupling means connected between said first and third lines at a region in said first line following said first coupling means and dimensioned to couple substantially half the power incident thereupon from said first line input end into said third line propagating toward the output end thereof, and third directional energy coupling means connected between said second and fourth lines at a region in said second line following said first coupling means and dimensioned to couple substantially half the power incident thereupon from said first line input end into said fourth line propagating toward the output end thereof.

22. A radio frequency transmission line circuit comprising first, second, third and fourth transmission lines, each having an input end and an output end, means to introduce energy into the input end of said first line, first directional energy coupling means connected between said first and second lines dimensioned to couple substantially half the power incident thereupon from said first line input end into said second line propagating toward the output end thereof, second directional energy coupling means connected between said first and third lines at a region in said first line following said first coupling means and dimensioned to couple substantially half the power incident thereupon from said first line input end into said third line propagating toward the output end thereof, third directional energy coupling means connected between said second and fourth lines at a region in said second line following said first coupling means and dimensioned to couple substantially half the power incident thereupon from said first line input end into said fourth line propagating toward the output end thereof, and means in said lines to bring into substantially the same phase the power which arrives in all four output ends from said first line input end.

23. A radio frequency transmission line circuit comprising first, second, third and fourth transmission lines, each having a first end and a second end, first directional energy coupling means connected between said first and second lines dimensioned to couple substantially half the power incident thereupon from the first end of one of said first and second lines into the other line propagating toward the second end thereof and vice versa, second directional energy coupling means connected between said second and third lines, at a region in said second line nearer to the second end thereof than said first coupling means, dimensioned to couple substantially half the power incident thereupon from the first end of one of said second and third lines into the other line propagating toward the second end thereof and vice versa, third directional energy coupling means connected between said first and fourth lines, at a region in said first line nearer to the second end thereof than said first coupling means, dimensioned to couple substantially half the power incident thereupon from the first end of one of said first and fourth lines into the other line propagating toward the second end thereof and vice versa, and fourth directional energy coupling means connected between said third and fourth lines, at a region in said third line nearer to the first end thereof than said second coupling means and a region in said fourth line nearer to the first end thereof than said third coupling means, dimensioned to couple substantially half the power incident thereupon from the second end of one of said third and fourth lines to the first end of the other line and vice versa.

24. A circuit in accordance with claim 23 in which each of the directional coupling means is of the kind which effects a phase difference of substantially ninety electrical degrees between the coupled and uncoupled output energy.

25. A radio frequency transmission line circuit comprising first, second, third and fourth transmission lines, each having a first end and a second end, first directional energy coupling means connected between said first and second lines dimensioned to couple a portion of the power incident thereupon from the first end of one of said first and second lines into the other line propagating toward the second end thereof and vice versa, second directional energy coupling means connected between said second and third lines, at a region in said second line nearer to the second end thereof than said first coupling means, dimensioned to couple a portion of the power incident thereupon from the first end of one of said second and third lines into the other line propagating toward the second end thereof and vice versa, third directional energy coupling means connected between said first and fourth lines, at a region in said first line nearer to the second end thereof than said first coupling means, dimensioned to couple a portion of the power incident thereupon from the first end of one of said first and fourth lines into the other line propagating toward the second end thereof and vice versa, and fourth directional energy coupling means connected between said third and fourth lines, at a region in said third line nearer to the first end thereof than said second coupling means and a region in said fourth line nearer to the first end thereof than said third coupling means, dimensioned to couple a portion of the power incident thereupon from the second end of one of said third and fourth lines to the first end of the other line and vice versa.

26. A circuit in accordance with claim 25 in which each of the directional coupling means is of the kind which effects a phase difference of substantially ninety electrical degrees between the coupled and uncoupled output energy.

27. A circuit in accordance with claim 25 including phase changing means in said transmission lines to bring into a desired phase relation the energy present in the second end of each line as a result of the introduction of energy into the first end of said first line.

HENRY J. RIBLET.

REFERENCES CITED

The following references are of record in the file of this patent:

UNITED STATES PATENTS

| Number | Name | Date |
|---|---|---|
| 2,129,669 | Bowen | Sept. 13, 1938 |
| 2,479,650 | Tiley | Aug. 23, 1949 |

OTHER REFERENCES

"A New Type of Waveguide Directional Coupler," by Riblet and Saad. Published in vol. 36, No. 1, January 1948 of Proceedings of the Institute of Radio Engineers, pages 61–64, using page 61 in particular.

Principles of Radar, by M. I. T. Radar School Staff (2nd edition), published by McGraw-Hill in 1946. (Copy in Division 69.)